J. WILLIAMSON.
PNEUMATIC SUSPENSION DEVICE FOR VEHICLES.
APPLICATION FILED SEPT. 5, 1912.
1,083,970.
Patented Jan. 13, 1914.
2 SHEETS—SHEET 2.
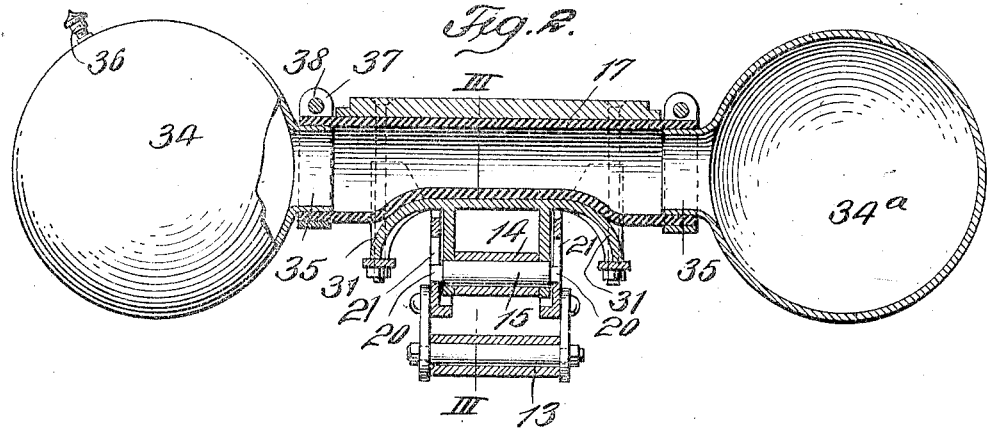
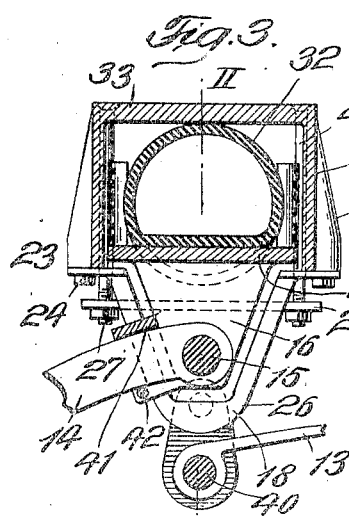
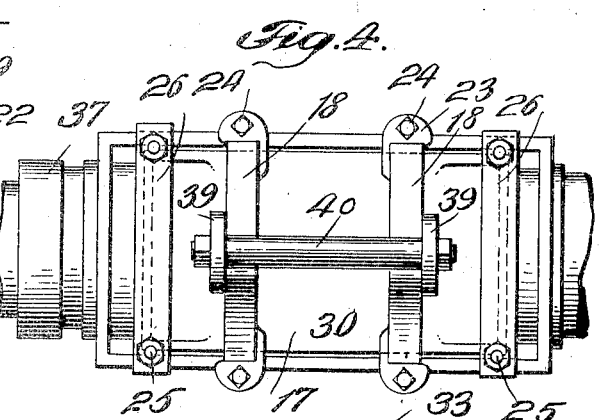
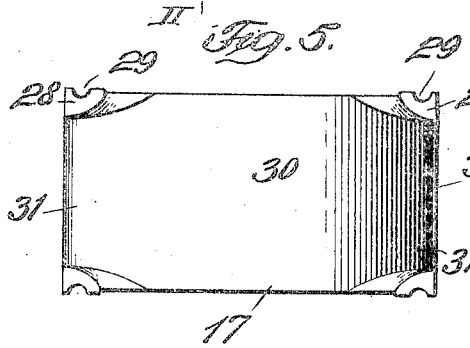
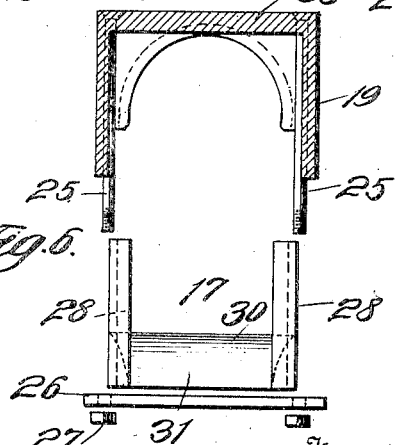
Inventor
J. Williamson
By his Attorneys
Criswell & Criswell

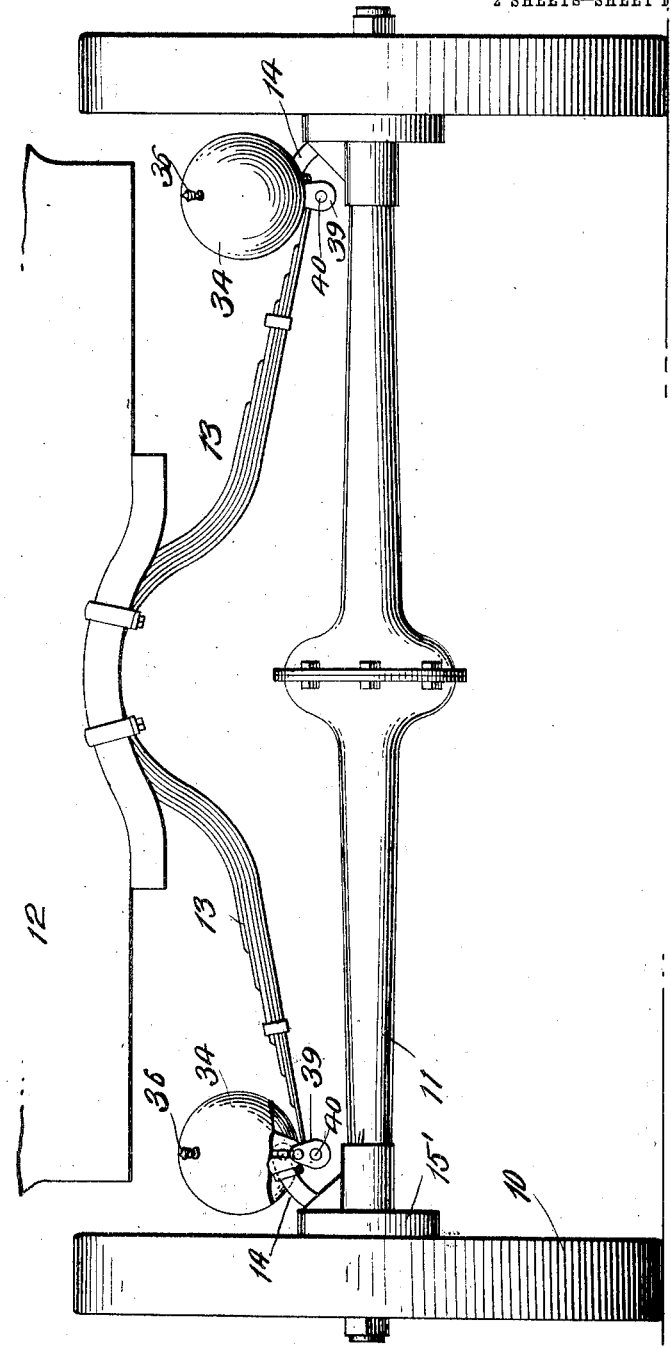

UNITED STATES PATENT OFFICE.

JOHN WILLIAMSON, OF NEW YORK, N. Y., ASSIGNOR OF ONE-HALF TO WARREN Y. HUFF, OF BROOKLYN, NEW YORK.

PNEUMATIC SUSPENSION DEVICE FOR VEHICLES.

1,083,970.  Specification of Letters Patent.  Patented Jan. 13, 1914.

Application filed September 5, 1912. Serial No. 718,660.

*To all whom it may concern:*

Be it known that I, JOHN WILLIAMSON, a citizen of the United States, and a resident of New York, borough of Brooklyn, county of Kings, and State of New York, have invented certain new and useful Improvements in Pneumatic Suspension Devices for Vehicles, of which the following is a full, clear, and exact description.

This invention relates more particularly to means which may be employed as a pneumatic spring for that class of motor vehicles in which the springs extend transversely of the vehicle body instead of lengthwise thereof.

The primary object of the invention is to provide means which may be located between each axle and the vehicle body at each side thereof, and in such a way that a part of the means is adapted to move with the vehicle body and another part movable relatively thereto and with the axle so as to compress a cushioning element or device forming pneumatic cushioning means between the said relatively movable parts to adapt all shocks to be diffused or absorbed when the wheels meet obstructions, and so to arrange and construct the parts that solid tires may be employed instead of the usual form of pneumatic tires, but with all the advantages of the pneumatic tires without the disadvantages thereof in the way of punctures, wear, and the like.

Another object of the invention is to provide simple and efficient pneumatic means in which the pressure will remain substantially constant while absorbing shocks and substantially the same cushioning effect secured as in the ordinary pneumatic tire.

A further object of the invention is to provide simple and efficient cushioning means which may be readily attached to or removed from vehicles as ordinarily constructed without practically any change whatever, and without any substantial change in the relative positions of the parts.

A still further object of the invention is to provide means of the character described which is simple in construction and which may be readily assembled.

A still further object of the invention is to provide a device in which a relatively short and straight tubular cushioning element may be employed to avoid the necessity of using a special form of pneumatic cushioning means, thereby materially enhancing the value and efficiency of the device, and at the same time materially reducing the cost of installation and keeping thereof.

With these and other objects in view, the invention will be hereinafter more particularly described with reference to the accompanying drawings, which form a part of this specification, and will then be pointed out in the claims at the end of the description.

In the drawings, Figure 1 is an end view of a motor vehicle showing one form of my invention applied thereto, one of the devices being broken away at one side of the vehicle for the purpose of better illustrating the same. Fig. 2 is an enlarged vertical section, partly in elevation, and taken on the line II—II of Fig. 3. Fig. 3 is a transverse section taken on the line III—III of Fig. 2. Fig. 4 is an inverted plan, partly broken away, of the device removed from the vehicle. Fig. 5 is a detail plan view of the plunger or compression member; and Fig. 6 shows in section and in elevation the casing and the compression member separated with the means whereby the compression member may be guided within the casing.

While the invention is shown as applied more especially to a vehicle in which the springs are arranged transversely of the body and over the axle, it is to be understood that the invention may be applied to or modified in such a way as to be applicable to various forms of motor vehicles, and while ordinarily four of said devices are used for each vehicle, this number may vary and a description of one and its operation will answer for the entire equipment of the car or vehicle.

The wheels 10 may be either solid or of the usual pneumatic construction and may be supported on an axle 11 in the usual way. The vehicle body 12 is supported as usual above the axle and extending transversely of the vehicle and at each end thereof is a spring 13 which is interposed between the axle and the vehicle body. The parts as thus described may be of the usual or of any preferred construction.

A lug or arm 14 projects inwardly from each of the enlarged portions or hubs 15' and carried by said lug is a bolt 15. This bolt 15 is held in the downwardly projecting parts 16 of a compression member or plunger 17. The plates or projecting portions 16 are guided in brackets 18 which are secured to and form a part of a casing 19, and said bolts have their ends milled or otherwise reduced, as at 20, to adapt them to move in vertical slots 21 formed in the bracket portions 18 of the casing or member 19. The compression member is movable relatively to the box-like casing and by having the brackets provided with cut-away or recessed portions forming guides for the downwardly projecting portions 15 and the ends 20 of the bolt 15 being guided in the slots 21 of said brackets 18, serve to keep said members in alinement and to properly guide each member with respect to the other.

The casing 19 is box-like in form and has its lower portion open to adapt the casing to be removed from the plunger or compression member from above, and said casing is provided with an enlarged portion forming ribs or bosses 22 to which the feet or lug portions 23 of the brackets 18 are secured by bolts 24 or in any other suitable way to adapt the casing to be detached from said brackets. There are two brackets 18 located on opposite sides of the longitudinal center of the casing and said brackets are similarly constructed.

As a means to guide the plunger or compression member within the casing, I arrange at each side thereof two bolts 25. These bolts are located adjacent to the corners of the casing and are cast or otherwise held thereto so that substantially one-half of the bolt projects outward within the interior of the casing so as to form guiding ribs. The bolts or guides 25 extend below the casing and said bolts are connected in pairs by a plate or bar 26 which is held to the bolts by means of nuts 27, and said plates serve to limit the downward movement of the compression member 17. This compression member 17 has vertically extending guides 28 located at the corners thereof and in which are semi-circular grooves 29 which are adapted to fit about the guide bolts to be guided thereon in the vertical relative movement of the compression member with respect to the casing or member 19. The compression member or plunger has a substantially rectangular body-portion 30 with downwardly extending and curved ends 31, and said ends are adapted to rest on the plates or tie rods 26.

The body portion 30 of the compression member or plunger 17 is adapted to engage the under surface of a cushioning element 32. This element 32 is in the form of a straight tubular body which may be substantially the size of the pneumatic tube of vehicle tires and is comparatively short projecting only slightly beyond the casing and is interposed between the body portion 30 and the upper wall 33 of said casing, so that as the casing and plunger move toward each other, the said cushioning means will be compressed and any shocks due to the wheels 11 meeting obstructions will be diffused or absorbed.

The ends of the cushioning element 32 communicate with ball-like or substantially spherical receivers 34 and 34ᵃ. These receivers are somewhat larger than the diameter of the cushioning element and may be of light metal and are adapted to hold air under pressure, and each receiver communicates with the cushioning element so that the air as the said element 32 is compressed may be forced into either or both receivers, and as soon as the shock is absorbed, the air may again pass into the tube or cushioning element to restore it to its normal and proper condition. These receivers are of such a size that air may pass from the compression element 32 without substantially increasing the pressure within the receivers or the cushioning element, and each receiver has a reduced open portion 35 to adapt the same to fit within one end of the tube or cushioning element 32. One of the receivers, as 34, is provided with an inflated valve 36 by which air may be forced into the receivers and the cushioning element, and each receiver is held to the cushioning element by a suitable clamp, as 37, which may be in the form of a split band passing around the ends of the cushioning element and adapted to have its ends forced together by a bolt 38 or in any other desired way. By this construction, efficient and inexpensive cushioning means is provided, and by having the body portion of the plunger or compression member curved, as at 31, the extent of the bearing surface is increased corresponding to the extent of the shock and consequently the resistance is also increased as the shocks vary.

A link 39 is held at one end to each of the brackets 18 so as to swing thereon and the lower ends of said links are connected by a bolt 40. The bolt 40 is held in one end of the spring 13 so that any downward movement of the vehicle body will cause a similar downward movement to be given to the casing 19 to diffuse the shocks in this direction, and at the same time by providing the links, the springs may expand or contract without tilting or shifting the vertical position of the casing and other parts of the cushioning means.

The downwardly projecting parts 16 of the plunger or compression member are connected on their interior surfaces by a transverse bar 41 which is adapted to rest on the upper surface of the lug or bracket 14, and said bar 41 has the ends extended so as to fit on the outer side of said lug 14 in order to permit one or more bolts 42 to be passed under said lug 14, thus holding the lug or bracket 14 between the bar 41 and the bolts 13.

42. By this construction, the bar 41 prevents the plunger and consequently the casing from tilting in one direction while the bolts 42 by their engagement under the lug 14 prevent tilting of the compression member or casing in the other direction, thus the parts are always maintained in a vertical position without any swinging movement whatever.

The construction and operation of the parts thus far described will be readily understood from the foregoing description when taken in connection with the accompanying drawings.

It will be apparent that as the vehicle moves along the roadway and in case the wheels should meet an obstruction, any movement of the wheels and axle will be conveyed through the arms or lugs 14 to the compression member or plunger 17, and this member will move vertically within the box-like member 19 and compress the tube and cushioning member 32. As the cushioning element is compressed, the air will be forced to either or both sides into the reservoirs 34 and 34ᵃ and on the recoil the air will again inflate the tube. The plunger or compression member 17 by reason of its construction, will during the compression movement, have its bearing surface against the tube increased, thus increasing the resistance and serving better to take up or compensate for shocks. The box-like member 19 is held yieldingly against movement by the spring 13, and by reason of the connection with the spring, each device may be held in a suspended position and still be free of any tilting movement because of the link connection between the ends of the spring and the box-like casing.

From the foregoing, it will be seen that a simple and efficient device is provided which is adapted to absorb or cushion shocks so as to obtain the advantages present in the ordinary pneumatic tire, at the same time permitting solid tires to be employed; that said device is simple in construction and may be readily made and assembled; that said device has simple means to take up shocks without substantially increasing the pressure in the cushioning means and which adapts the device to be employed on vehicles as ordinarily constructed; and that said device is so constructed that it is particularly adapted for motor vehicles in which the springs extend transversely of the vehicle body instead of lengthwise thereof.

Having thus described my invention, I claim as new and desire to secure by Letters Patent:—

1. The combination of a vehicle body, an axle, wheels mounted on the axle, a spring, a device having two parts movable one within the other, one part being held to move with the axle and the other part of each device held to one end of the spring, each device being held against any swinging movement, compressible cushioning means located between the members, and a reservoir connected to each end of said cushioning means.

2. The combination of a vehicle body, an axle, wheels mounted on the axle, a lug projecting from the axle, a spring, a device having two parts movable one within the other, one part being held to one of the lugs and the other part of each device held to one end of the spring, each device being held against any swinging movement, compressible cushioning means located between the members, and a reservoir connected to each end of said cushioning means.

3. The combination of a box-like member having parts thereof adapted for attachment to a spring, a compression member movable within the box-like member and having a plate-like compression portion with curved ends adapted to vary the extent of bearing surface during its compression movement, means for guiding the members relatively with respect to each other, a compression tube supported in the box-like member, and substantially spherical metallic reservoirs having unrestricted connections with both ends of the tube.

4. The combination of a box-like casing having an open lower surface and brackets detachably held to the casing, a compression member movable vertically within the box-like member and guided therein, a short straight and tubular cushioning element interposed between the compression member and the box-like member, and spherical receivers connected to the cushioning element at the ends thereof.

5. The combination of a box-like casing having an open lower surface and brackets detachably held to the casing, a compression member having curved outer ends and movable vertically within the box-like member and guided therein, a short straight tubular cushioning element of rubber interposed between the compression member and the box-like member, and metallic receivers connected to the cushioning element at both ends thereof.

6. The combination of a box-like casing having brackets detachably held to the casing, a compression member movable vertically within the box-like member and guided therein, a tubular pneumatic cushioning element interposed between the compression member and the box-like member, and spherical receivers connected to the cushioning element at the ends thereof.

7. The combination of a box-like casing having its lower surface open, brackets detachably secured to said casing, bolts cast in said casing and forming guide rods having their ends projecting below said casing, bars connecting the bolts together in pairs, a compression member having a substantially rectangular body provided with guides at the corners thereof having grooves adapted to engage the guide bolts and to be guided thereon, a tubular cushioning element interposed between the compression member and the top of the casing, and receivers connected to and communicating with the cushioning element.

8. The combination of a casing, bolts held in said casing and forming guide rods having their ends projecting below said casing, a compression member having a substantially rectangular body provided with guides at the corners thereof having grooves adapted to engage the guide bolts and to be guided thereon, a tubular cushioning element interposed between the compression member and the casing, and receiving means communicating with the cushioning element.

9. The combination of a box-like casing, bolts cast in said casing and forming guide rods, a compression member provided with guides having grooves adapted to engage the guide bolts and to be guided thereon, and a tubular cushioning element interposed between the compression member and the casing.

10. The combination of a box-like casing, brackets secured to said casing, a compression member guided to move vertically within said box-like casing and having downwardly projecting parts adapted to be connected to a vehicle axle, means whereby the downwardly projecting parts of the compression member may be guided in the brackets of the casing, a cushioning element interposed between the top of the casing and the body of the compression member, said compression member having its ends curved to increase the extent of bearing surface and consequently the resistance, and links adapted to connect the brackets to the vehicle spring.

11. The combination of a casing, a compression member guided to move vertically within said casing and having parts adapted to be connected to a vehicle axle and provided with means to prevent a swinging movement of said member and the casing, means whereby the compression member may be guided in the casing, a cushioning element interposed between the casing and the compression member, a reservoir connected to each end of said cushioning means, said compression member having its ends curved to increase the extent of bearing surface and consequently the resistance, and links adapted to connect the casing to the vehicle spring.

12. The combination of a box-like casing, brackets detachably secured to said casing, a compression member guided to move vertically within said box-like casing and having downwardly projecting parts adapted to be connected to a vehicle axle and be held against a swinging movement, means whereby the downwardly projecting parts of the compression member may be guided in the brackets of the casing, a cushioning element interposed between the top of the casing and the body of the compression member, and means adapted to connect the brackets pivotally to the vehicle spring.

13. The combination of a casing, brackets detachably secured to said casing, a compression member guided to move vertically within said casing and having parts adapted to be connected to a vehicle axle, a cushioning element interposed between the top of the casing and the body of the compression member, a reservoir connected at each end of said cushioning means, said compression member having its ends curved to increase the extent of bearing surface and consequently the resistance, and links adapted to connect the brackets to the vehicle spring.

14. The combination of an axle having a projecting lug, a spring, a casing, a compression member having a relative movement with respect to the casing and guided thereby, parts mounted on the compression member and engaging said lug to prevent swinging movement of both the casing and the compression member, and pneumatic cushioning means interposed between the casing and the compression member.

This specification signed and witnessed this 31st day of August, A. D. 1912.

JOHN WILLIAMSON.

Witnesses:
JOHN C. McFACHEN,
C. BARTELS.